United States Patent
Hotta et al.

(10) Patent No.: US 7,898,910 B2
(45) Date of Patent: Mar. 1, 2011

(54) OPTICAL PICKUP APPARATUS

(75) Inventors: Tohru Hotta, Nagano (JP); Ryoichi Kawasaki, Gunma (JP)

(73) Assignees: Sanyo Electric Co., Ltd., Osaka (JP); Sanyo Optec Design co., Ltd., Tokyo (JP)

( * ) Notice: Subject to any disclaimer, the term of this patent is extended or adjusted under 35 U.S.C. 154(b) by 341 days.

(21) Appl. No.: 12/147,564

(22) Filed: Jun. 27, 2008

(65) Prior Publication Data
US 2009/0022037 A1    Jan. 22, 2009

(30) Foreign Application Priority Data
Jul. 17, 2007 (JP) ............................. 2007-185575

(51) Int. Cl.
*G11B 7/00* (2006.01)
(52) U.S. Cl. .............. 369/44.23; 369/44.28; 369/44.14; 369/112.23; 369/112.24
(58) Field of Classification Search ........................ None
See application file for complete search history.

(56) References Cited

U.S. PATENT DOCUMENTS 7,543,312 B2 * 6/2009 Kim et al. .................... 720/683
2009/0290476 A1 * 11/2009 Okada .................... 369/112.23

FOREIGN PATENT DOCUMENTS

| JP | 2004-272949 | 9/2004 |
| JP | 2006-019001 | 1/2006 |
| JP | 2006-172605 | 6/2006 |

* cited by examiner

*Primary Examiner* — Muhammad N Edun
(74) *Attorney, Agent, or Firm* — Fish & Richardson P.C.

(57) ABSTRACT

An optical pickup apparatus comprising: a first objective lens; and a second objective lens arranged with the first objective lens in a radial direction of an optical disc, the first objective lens being configured to focus laser light for reproduction, which is laser light for reproducing a signal recorded in a signal recording layer of the optical disc, onto the signal recording layer, the second objective lens being configured to focus laser light for recording, which is laser light for recording a signal, onto the signal recording layer.

14 Claims, 5 Drawing Sheets

OPTICAL PICKUP APPARATUS

CROSS-REFERENCE TO RELATED APPLICATION

This application claims the benefit of priority to Japanese Patent Application No. 2007-185575, filed Jul. 17, 2007, of which full contents are incorporated herein by reference.

BACKGROUND OF THE INVENTION

1. Field of the Invention

The present invention relates to an optical pickup apparatus performing an operation of reading out a signal recorded in an optical disc or of recording a signal in an optical disc.

2. Description of the Related Art

There is widely used an optical disc apparatus capable of performing an operation of reading out a signal or recording a signal by irradiating a signal recording layer of an optical disc with a laser light emitted from an optical pickup apparatus.

There is generally used an optical disc apparatus using an optical disc such as CD and DVD, while there has been recently developed an optical disc apparatus using an optical disc with improved recording density, i.e., an optical disc of the Blu-ray standard or the HD DVD (High Definition Digital Versatile Disc) standard.

For a laser light for the operation of reading out a signal recorded in the optical disc of the CD standard, an infrared light with a wavelength of 780 nm is used. For a laser light for the operation of reading out a signal recorded on the optical disc of the DVD standard, a red light with a wavelength of 650 nm is used.

There is provided a protective layer with a thickness of 1.2 mm on a top face of the signal recording layer of the optical disc of the CD standard, and a numerical aperture of an objective lens for use in performing the operation of reading out a signal from the signal recording layer is specified at 0.45. There is provided a protective layer with a thickness of 0.6 mm on a top face of a signal recording layer of the optical disc of the DVD standard, and a numerical aperture of an objective lens for use in performing the operation of reading out a signal from the signal recording layer is specified at 0.6.

In contrast to the above-described optical discs of the CD standard and the DVD standard, for a laser light for the operation of reading out a signal recorded on the optical disc of the Blu-ray standard or the HD DVD standard, a laser light with a shorter wavelength, a blue-violet light with a wavelength of 405 nm is used, for example.

There is provided a protective layer with a thickness of 0.1 mm on a top face of a signal recording layer of the optical disc of the Blu-ray standard, and a numerical aperture of an objective lens for use in performing the operation of reading out a signal from the signal recording layer is specified at 0.85.

On the other hand, there is provided a protective layer with a thickness of 0.6 mm on a top face of a signal recording layer of the optical disc of the HD DVD standard, and a numerical aperture of an objective lens for use in performing the operation of reading out a signal from the signal recording layer is specified at 0.65.

As described above, for the laser light for performing the operation of reading out signals recorded on the optical discs of the Blu-ray standard and the HD DVD standard, the blue-violet light with a wavelength of 405 nm can be used. Thus, by using a laser diode in common for the both optical discs, it may become possible to produce an optical pickup apparatus capable of performing the operation of reading out signals from the optical discs of these two standards.

In order to read out signals from the both optical discs, however, the numerical aperture needs to be changed corresponding to each of the optical discs since the location of the signal recording layer and the numerical aperture required of the objective lens are different between the two optical discs. There has been developed an optical pickup apparatus capable of performing the above-described operation (see Japanese Patent Application Laid-Open Publication No. 2006-172605).

Recently, there is commercialization of an optical disc apparatus capable of using not only optical discs of the above described CD standard and DVD standard but also optical discs of the Blu-ray standard or the HD DVD standard. Consequently, an optical pickup apparatus used for such an optical disc apparatus naturally results in being configured so as to be able to perform the operation of reading out the signals from the signal recording layer provided in the optical disc of a compatible standard or the operation of recording the signals onto the signal recording layer provided therein.

In such an optical pickup apparatus, it is difficult to apply the laser light having the above-described wavelength onto the signal recording layer of the optical disc by a single objective lens, thereby using two objective lenses: one objective lens for applying the laser light to the optical discs of the CD standard and the DVD standard, for example; and the other objective lens for applying the laser light to the optical disc of the Blu-ray standard, for example (See Japanese Patent Application Laid-Open Publication No. 2006-19001).

As mentioned above, the blue-violet light with a wavelength of 405 nm is used as the laser light for the operation of reading-out a signal recorded in the optical disc of the Blu-ray standard or the HD DVD standard, however, intensity of the laser light on a disc face required for recording a signal in the optical disc in the optical disc device is remarkably larger as compared with the intensity of the laser light on the disc face required for reproduction.

In the optical disc device, a switching operation between the laser intensity for the recording operation and the laser intensity for the reproduction operation is carried out in general by switching a level of a driving signal supplied to a laser diode. However, the laser diode for generating the blue-violet light has an extremely strict reproduction margin, and quantum noise is a serious problem.

In order to solve the above problem, such an art is developed in which laser light whose output capable of a recording operation is emitted from a laser diode and an intensity filter is interposed in an optical path of the laser light during the reproduction operation so that the laser light with an intensity suitable for the reproduction operation can be obtained (See Japanese Patent Application Laid-Open Publication No. 2004-272949).

In the art disclosed in Japanese Patent Application Laid-Open Publication No. 2004-272949, there is described an art using an intensity filter for changing the intensity of the laser light, however, since this art needs not only the intensity filter but also control mechanisms for electrically controlling the intensity filter and for mechanically moving the intensity filter, there is a problem that the optical pickup apparatus becomes complicated in configuration as well as expensive.

SUMMARY OF THE INVENTION

An optical pickup apparatus according to an aspect of the present invention, comprises: a first objective lens; and a second objective lens arranged with the first objective lens in a radial direction of an optical disc, the first objective lens being configured to focus laser light for reproduction, which is laser light for reproducing a signal recorded in a signal recording layer of the optical disc, onto the signal recording layer, the second objective lens being configured to focus laser light for recording, which is laser light for recording a signal, onto the signal recording layer.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
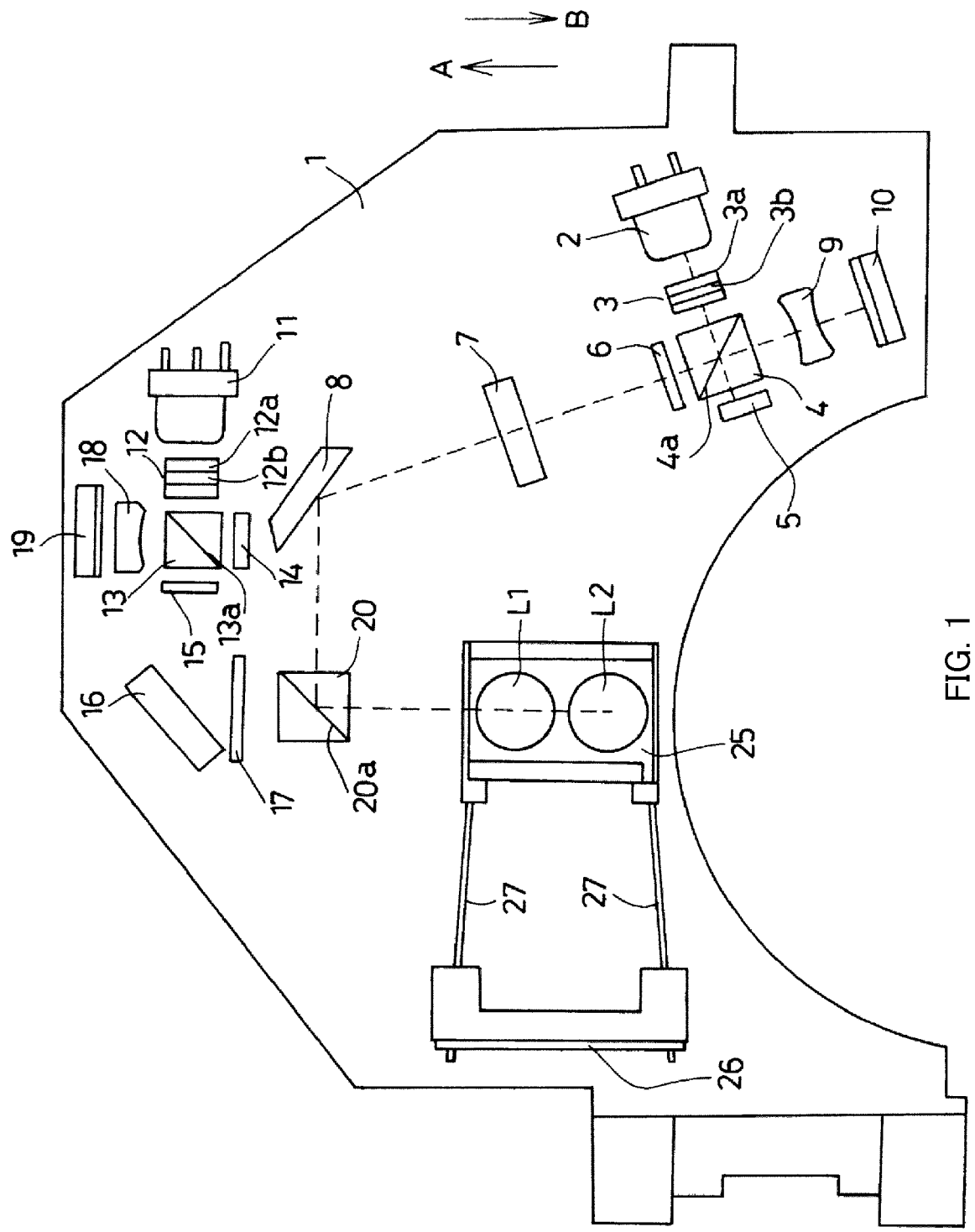
FIG. 1 is a schematic diagram showing an optical pickup apparatus according to an embodiment of the present invention.

At least the following details will become apparent from descriptions of this specification and of the accompanying drawings.

An optical pickup apparatus according to an embodiment of the present invention includes a lens holder fixed so that a straight line connecting a center axis of a first objective lens and a center axis of a second objective lens matches in direction with a radial direction of an optical disc and supported by a plurality of support wires so as to be capable of displacing the lens holder in a direction perpendicular to a signal face of the optical disc and the radial direction of the optical disc, and an optical pickup apparatus is configured so that one of the objective lenses is used as an objective lens for reproduction for focusing laser light for reproduction used for a reproduction operation of a signal recorded in a signal recording layer included in the optical disc, while the other objective lens is used as an objective lens for recording for focusing laser light for recording used for recording a signal in the signal recording layer included in the optical disc.

An optical pickup apparatus according to an embodiment of the present invention is configured so that when the first objective lens is an objective lens arranged on an outer circumference side of the optical disc, the first objective lens is used as the objective lens for reproduction.

An optical pickup apparatus according to an embodiment of the present invention includes a first raising mirror for leading the laser light emitted from a laser diode to the first objective lens and a second raising mirror for leading the laser light emitted from the laser diode to the second objective lens.

An optical pickup device according to an embodiment of the present invention is configured such that a transmissive mirror or a polarization beam splitter is used as the first raising mirror, the laser light passing through the first raising mirror is allowed to impinge on the second raising mirror as the laser light for recording.

An optical pickup apparatus according to an embodiment of the present invention is configured so as to adjust intensity on a disc face of the optical disc of the laser light for reproduction and the laser light for recording by reflectance and transmittance of the first raising mirror.

An optical pickup apparatus according to an embodiment of the present invention uses an all-reflective mirror as the second raising mirror.

An optical pickup apparatus according to an embodiment of the present invention is configured so that when a distance between the first objective lens held by the lens holder and a surface of the optical disc and a distance between the second objective lens held by the lens holder and the surface of the optical disc are the same, focusing points of the first objective lens and the second objective lens in the direction perpendicular to the signal face of the optical disc are different from each other.

An optical pickup apparatus according to an embodiment of the present invention is configured such that a first laser diode is provided for emitting laser light with such a wavelength as to use the first objective lens as the objective lens for reproduction, and a second laser diode is provided for emitting laser light with such a wavelength, different from that of a first laser diode, as to use the second objective lens as the objective lens for recording, so that the reproduction operation of a signal recorded in optical discs in different standards can be carried out by leading the laser light emitted from the second laser diode to the first objective lens.

An optical pickup apparatus of an embodiment according to the present invention includes the first raising mirror for reflecting the laser light emitted from the first laser diode toward the first objective lens as the laser light for reproduction and allowing the laser light to pass therethrough toward the second objective lens as the laser light for recording, and the second raising mirror for reflecting the laser light for recording having passed through the first raising mirror toward the second objective lens, and a wavelength-selective mirror is used for the first raising mirror so that the laser light emitted from the second laser diode is totally reflected by the first raising mirror.

In an optical pickup apparatus of an embodiment according to the present invention including the lens holder fixed so that the straight line connecting the center axis of the first objective lens and the center axis of the second objective lens matches in direction with the radial direction of the optical disc and supported by the plurality of support wires so as to be capable of displacing the lens holder in the direction perpendicular to the signal face of the optical disc and in the radial direction of the optical disc, one of the objective lenses is used as an objective lens for reproduction used for focusing the laser light for reproduction performing the reproduction operation of a signal recorded in the signal recording layer included in the optical disc while the other objective lens is used as an objective lens for recording used for focusing the laser light for recording for recording a signal in a signal recording layer included in the optical disc. Thus, there can easily be conducted a setting operation of a laser output suitable for the recording operation and the reproduction operation.

In an optical pickup apparatus of an embodiment according to the present invention, since when the first objective lens is the objective lens arranged on the outer circumference side of the optical disc, the first objective lens is used as the objective lens for reproduction, that is, the second objective lens provided on an inner circumference side is used as the objective lens for recording, it is effective when a region is used, which is provided, for the recording operation, on the innermost circumference side of the optical disc for recording.

In an optical pickup apparatus of an embodiment according to the present invention, since there are provided the first raising mirror for leading the laser light emitted from the laser diode to the first objective lens and the second raising mirror for leading the laser light emitted from the laser diode to the second objective lens so as to adjust intensity on the disc face of the laser light for reproduction and the laser light for recording by reflectance and transmittance of the first raising mirror, such an advantage is given that an intensity filter and the like as in the prior art is not required and a configuration can be simplified and costs are reduced.

Figure 2:
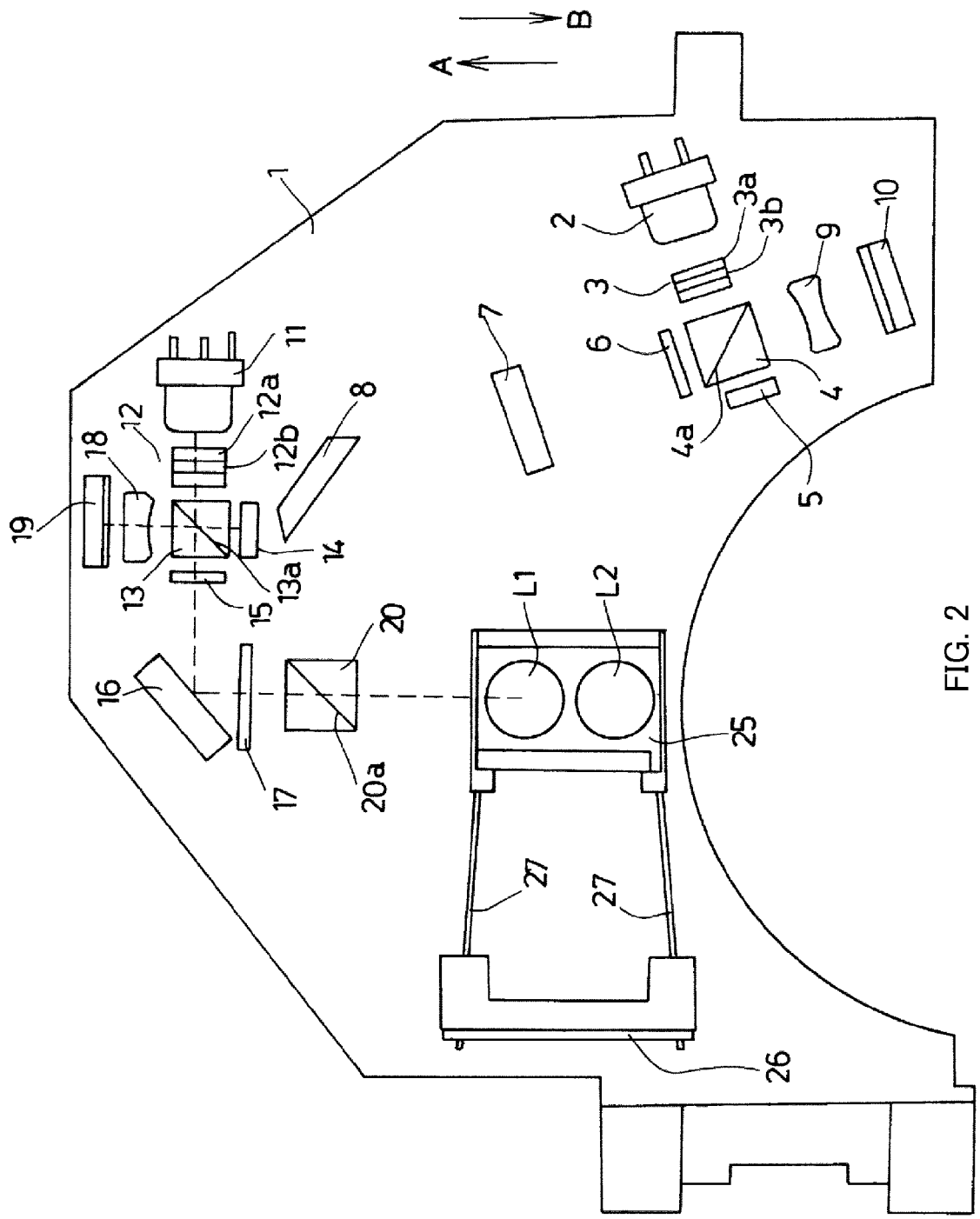
FIG. 2 is a schematic diagram showing an optical pickup apparatus according to an embodiment of the present invention.
Figure 3:
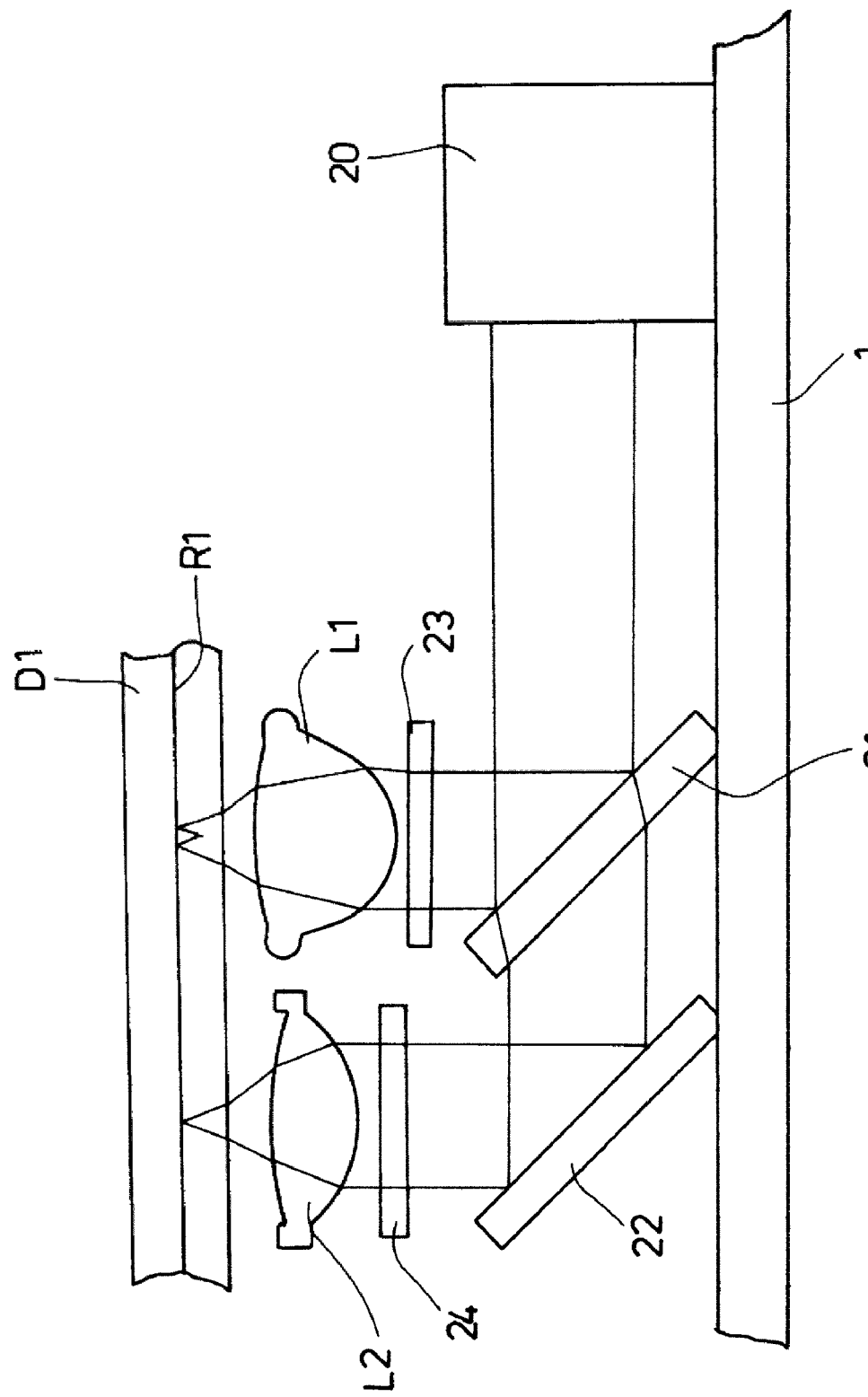
FIG. 3 is a schematic diagram showing a relationship between an optical disc and an optical system in an optical pickup apparatus according to an embodiment of the present invention.
Figure 4:
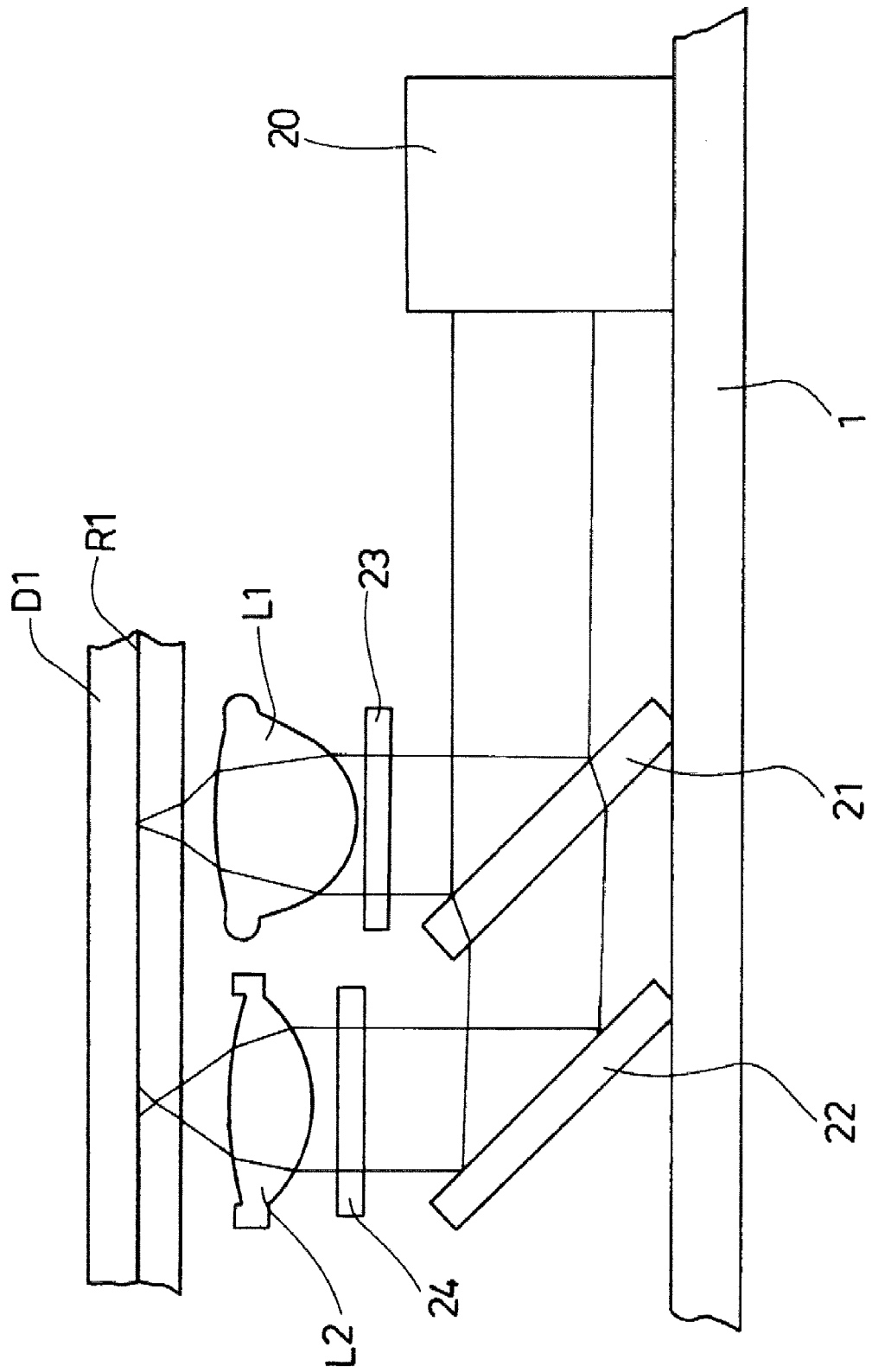
FIG. 4 is a schematic diagram showing a relationship between an optical disc and an optical system in an optical pickup apparatus according to an embodiment of the present invention.
Figure 5:
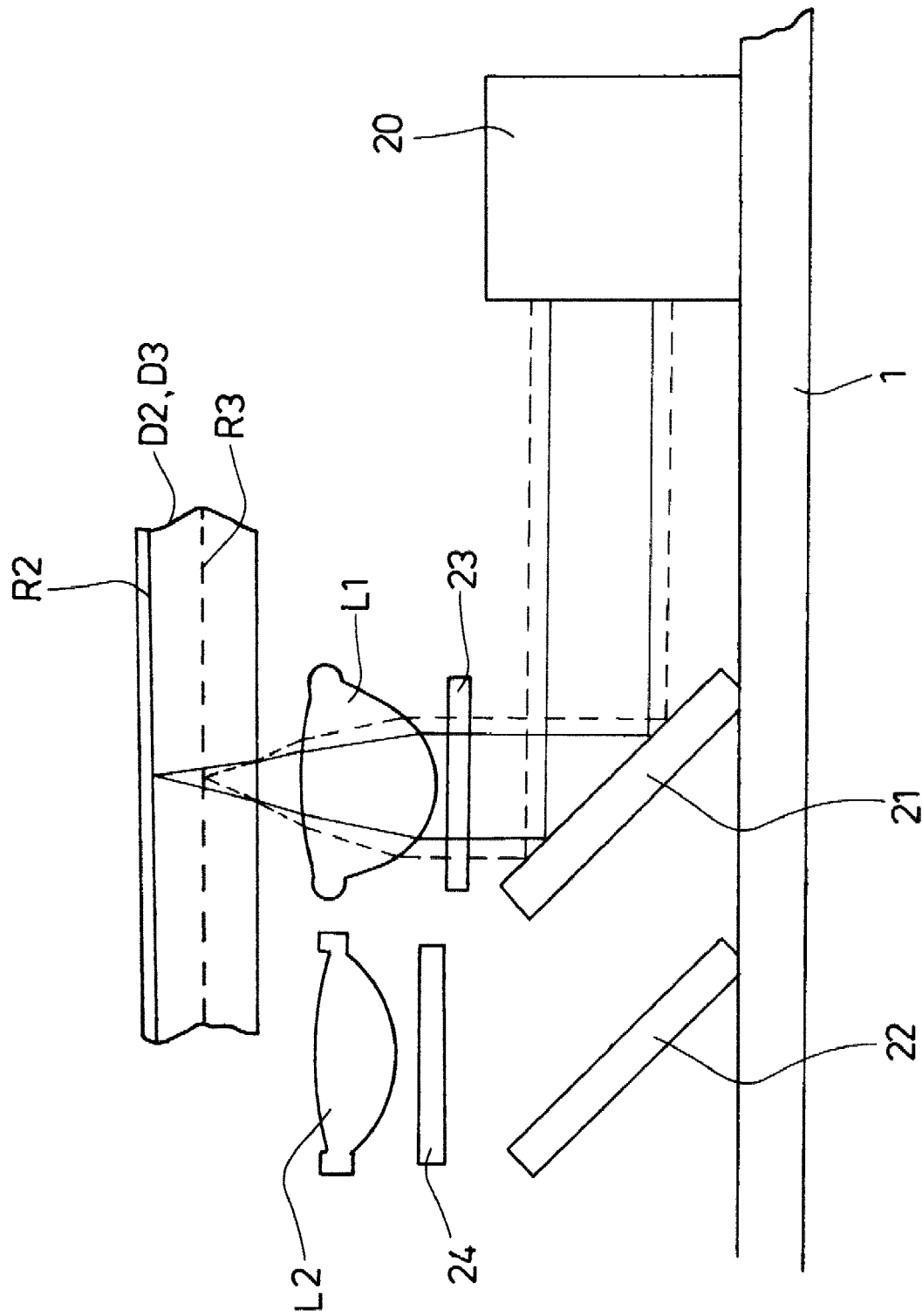
FIG. 5 is a schematic diagram showing a relationship between an optical disc and an optical system in an optical pickup apparatus according to the embodiment of the present invention.

FIGS. 1 and 2 are schematic diagrams showing an optical pickup apparatus according to an embodiment of the present invention, and FIGS. 3, 4, and 5 are schematic diagrams showing a relationship between an optical disc and an optical system.

In an embodiment according to the present invention, an optical pickup apparatus conforming to an HD DVD standard optical disc (first optical disc D1), a CD-standard optical disc (second optical disc D2), and a DVD-standard optical disc (third optical disc D3) will be described.

In FIGS. 1 and 2, reference numeral 1 denotes a base making up the optical pickup apparatus and it is configured so as to be displaced in the radial direction of the optical disc, that is, in arrow A and arrow B directions by a pickup driving mechanism included in the optical disc device. Since a configuration of such an optical pickup driving mechanism is known, the description is omitted.

Reference numeral 2 denotes a laser diode emitting first laser light, for example, which is blue-violet light of a first wavelength such as a wavelength of 405 nm. Reference numeral 3 is a first diffraction grating which the first laser light emitted from the laser diode 2 enters, and includes a diffraction grating portion 3a for splitting the first laser light into the 0th-order light, +1st-order light and −1st-order light; and a half-wave plate 3b for converting the incident first laser light into a linear polarization light in the S direction.

Reference numeral 4 denotes a first polarization beam splitter which the laser light having passed through the diffraction grating 3 enters and includes a control film 4a reflecting S-polarized first laser light and allowing the first laser light polarized in the P direction to pass therethrough. Reference numeral 5 denotes a first photodetector for monitoring provided at a position where the laser light passing through the first polarization beam splitter 4 in the first laser light emitted from the laser diode 2 is applied, and a detection output of the photodector is used for controlling an output of the laser light to be emitted from the laser diode 2.

Reference numeral 6 is a first quarter-wave plate provided at a position where the first laser light reflected by the control film 4a of the first polarization beam splitter 4 enters and converts the incident first laser light from linear polarization light into circular polarization light. Reference numeral 7 denotes a first collimating lens to which the laser light having passed through the first quarter-wave plate 6 enters and converts the incident laser light into parallel light and corrects spherical aberration caused by a protective layer of the HD DVD standard first optical disc D1.

Reference numeral 8 is a first reflective mirror that the first laser light having been converted into the parallel light in the first collimating lens 7 impinges on, and which reflects the first laser light; and the first reflective mirror is provided so that return light reflected from a signal recording layer R1 of the first optical disc D1 is applied to the mirror, and the return light is reflected in a direction of the first polarization beam splitter 4, as will be described later.

Reference numeral 9 is a first sensor lens which the return light having passed through the control film 4a included in the first polarization beam splitter 4 enters, and which has a cylindrical face, a flat face, a concave curved face or a convex curved face and the like formed on the sides of an incident face and an emitting face. Such first sensor lens 9 is provided for generating a focus error signal used for a focusing control operation by generating astigmatism in the return light.

Reference numeral 10 is a first photodetector provided at a position where the return light from the first sensor lens 9 is focused and applied, and the photodetector is made up of a four-divided sensor and the like, in which photodiodes are arranged. The configuration of such first photodetector 10 and a generation operation of the focus error signal by astigmatism method and the like are known and the description is omitted.

The laser diode 2, the first diffraction grating 3, the first polarization beam splitter 4, the first photodetector 5 for monitoring, the first quarter-wave plate 6, the first collimating lens 7, the first reflective mirror 8, the first sensor lens 9, and the first photodetector 10, as described above, make up a first optical system of the optical pickup apparatus according to an embodiment of the present invention, that is, an optical system forming an optical path of the laser light used for the first optical disc D1, and such first optical system is provided on the base 1.

There is configured, as mentioned above, the first optical system that the laser light passes through performing the reproduction operation of a signal recorded in the signal recording layer R1 included in the first optical disc D1 or the recording operation of a signal in the signal recording layer R1; and a configuration of a second optical system that the laser light passes through, performing the reproduction operation of a signal recorded in signal recording layers R2 and R3 respectively included in the second optical disc D2 and the third optical disc D3, or the recording operation of a signal in the signal recording layers R2 and R3, will be described next.

Reference numeral 11 denotes a 2-wavelength laser diode emitting two laser lights with different wavelengths, which are second laser light, for example, infrared light of a second wavelength such as a wavelength of 780 nm and third laser light, for example, red light of a third wavelength such as a wavelength of 650 nm.

Reference numeral 12 denotes a second diffraction grating which the second laser light or the third laser light emitted from the 2-wavelength laser diode 11 enters; and includes a diffraction grating portion 12a for splitting the incident laser light into the 0th-order light, +1st-order light and −1st-order light, and a half-wave plate 12b for converting the incident laser light into a linear polarization light in the S direction.

Reference numeral 13 denotes a second polarization beam splitter which the laser light having passed through the second diffraction grating 12 enters, and includes a control film 13a reflecting the S-polarized second laser light or third laser light and allowing the second laser light or third laser light polarized in the P direction to pass therethrough. Reference numeral 14 denotes a second photodetector for monitoring provided at a position where the laser light reflected at the control film 13a of the second polarization beam splitter 13 in the second laser light or third laser light emitted from the 2-wavelength laser diode 11 is applied, and a detection output of the photodetector is used for controlling an output of the laser light to be emitted from the 2-wavelength laser diode 11.

Reference numeral 15 is a second quarter-wave plate, which the second laser light or third laser light having passed through the second polarization beam splitter 13 enters, and which converts the incident second laser light or third laser light from linear polarization light into circular polarization light.

Reference numeral 16 denotes a second reflective mirror to which the second laser light or third laser light having passed through the second quarter-wave plate 15 is applied, and which reflects the incident laser light; and the second reflective mirror is provided so that return light reflected from the signal recording layer R2 of the second optical disc D2 or the signal recording layer R3 of the third optical disc D3 is applied thereto, and the return light is reflected in a direction of the second polarization beam splitter 13, as will be described later.

Reference numeral 17 denotes a second collimating lens which the second laser light or third laser light reflected at the second reflective mirror 16 enters, and which converts the laser light into parallel light.

Reference numeral 18 denotes a second sensor lens which the return light reflected by the control film 13a included in the second polarization beam splitter 13 enters, and which has a cylindrical face, a flat face, a concave curved face or a convex curved face and the like formed on the sides of an incident face and an emitting face. Such second sensor lens 18 is provided for generating a focus error signal used for the focusing control operation by generating astigmatism in the return light.

Reference numeral 19 is a second photodetector provided at a position where the return light having passed therethrough the second sensor lens 18 is focused and applied, and the photodetector is made up of a four-divided sensor and the like, in which photodiodes are arranged. The configuration of such second photodetector 19 and the generation operation of the focus error signal by astigmatism method and the like are known and the description is omitted.

The 2-wavelength laser diode 11, the second diffraction grating 12, the second polarization beam splitter 13, the second photodetector 14 for monitoring, the second quarter-wave plate 15, the second reflective mirror 16, the second collimating lens 17, the second sensor lens 18, and the second photodetector 19, as described above, make up a second optical system of the optical pickup apparatus according to an embodiment of the present invention, that is, an optical system forming an optical path of the laser light used for the second optical disc D2 and the third optical disc D3, and such second optical system, as well as the above-mentioned first optical system, is provided on the base 1.

Reference numeral 20 denotes a wavelength selective polarization beam splitter which the first laser light reflected by the first reflective mirror 8 making up the first optical system and the second laser light or the third laser light reflected by the second reflective mirror 16 making up the second optical system enter from different directions, and which is fixed onto the base 1. A control film 20a included in the wavelength selective polarization beam splitter 20 is configured to have characteristics of reflecting the first laser light of the first wavelength and allowing the second laser light of the second wavelength and the third laser light of a third wavelength to pass therethrough.

Reference numeral 21 is the first raising mirror to which the first laser light reflected by the wavelength selective polarization beam splitter 20 and the second laser light or the third laser light having passed through the wavelength selective polarization beam splitter 20 is applied, and which reflects each of the laser lights in a direction perpendicular to the signal faces of the optical discs D1, D2, and D3; and the first raising mirror is fixed onto the base 1 as shown in FIG. 3.

On a surface of such first raising mirror 21, a control film having wavelength selective characteristics is formed, and a configuration has been made such that, by action of such control film, for example, 90% of the first laser light passes through as the laser light for recording and 10% of the laser light is reflected as the laser light for reproduction, while 100% of the second laser light and the third laser light are reflected.

Reference numeral 22 is the second raising mirror to which the first laser light having passed through the first raising mirror 21 is applied, and which totally reflects the first laser light in a direction perpendicular to the signal face of the optical disc D1; and the mirror is fixed onto the base 1 as shown in FIG. 3.

Reference character L1 is the first objective lens which is arranged in optical paths of the first laser light, the second laser light and the third laser light reflected by the first raising mirror 21; and which focuses the incident first laser light to the signal recording layer R1 included in the first optical disc D1, the second laser light to the signal recording layer R2 of the second optical disc D2, and the third laser light to the signal recording layer R3 of the third optical disc D3.

Reference character L2 is the second objective lens which is arranged in the optical path of the first laser light reflected by the second raising mirror 22, and which focuses the incident first laser light to the signal recording layer R1 included in the first optical disc D1.

Reference numeral 23 denotes a first aperture limiting element which is provided in an optical path between the first raising mirror 21 and the first objective lens L1; and which sets the numerical aperture of the first objective lens L1 at 0.65 when using the first optical disc D1, the numerical aperture of the first objective lens L1 at 0.45 when using the second optical disc D2, and the numerical aperture of the first objective lens L1 at 0.6 when using the third optical disc D3. A control element using liquid crystal may be used as such first aperture limiting element 23, as known, and the description is omitted.

Reference numeral 24 denotes a second aperture limiting element which is provided in an optical path between the second raising mirror 22 and the second objective lens L2, and which sets the numerical aperture of the first objective lens L1 at 0.65 when using the first optical disc D1. A control element using liquid crystal may be used as such second aperture limiting element 24, as known, and the description is omitted.

In FIG. 1, reference numeral 25 denotes a lens holder to which the first objective lens L1 and the second objective lens L2 are fixed and the lens holder is supported by a plurality of, for example, four, support wires 27 fixed by solder to a printed-circuit board 26 whose one end is fixed to the base 1, so as to be capable of an displacement operation in a direction perpendicular to the signal face of the optical disc, that is, in the focus direction; and an displacement operation in a radial direction of the optical disc, that is, in the tracking direction.

The lens holder 25 is provided with a focusing coil and a tracking coil, as known, to which a focus control signal and a tracking control signal are supplied through the support wires 27, and a configuration is made such that the lens holder 25 is displaced in the focus direction and the tracking direction in cooperation with a magnet provided on the base 1.

Also, a configuration is made such that a straight line connecting a center axis, which is an optical axis of the first objective lens L1 fixed onto the lens holder 25, and a center axis, which is an optical axis of the second objective lens L2 matches in direction with the radial direction of the optical disc.

In such a configuration, a configuration is made such that when a distance between the first objective lens L1 held by the lens holder 25 and the surface of the first optical disc D1 and a distance between the second objective lens L2 held by the lens holder 25 and the surface of the first optical disc D1 are the same, focusing points in the perpendicular direction of the first objective lens L1 and the second objective lens L2 to the signal face of the first optical disc D1 are different from each other. That is, a configuration is made such that when the first laser light is focused by the first objective lens L1 on the signal recording layer R1 of the first optical disc D1 as laser light for reproduction, the laser light for recording to be focused by the second objective lens L2 is not to be focused on the signal recording layer R1. Similarly, when the first laser light is focused by the second objective lens L2 on the signal recording layer R1 of the first optical disc D1 as laser light for recording, the laser light for reproduction to be focused by the first objective lens L1 is not to be focused on the signal recording layer R1.

The optical pickup apparatus according to an embodiment of the present invention is configured as described above, and the recording and reproduction operations of a signal by the first optical system in the optical pickup apparatus having such configuration, that is, an operation of a case where the first optical disc D1 is used will be described next.

First, an operation when recording a signal in the first optical disc D1 will be described. In the case of the recording operation using the first optical disc D1, a control operation is carried out for focusing the first laser light passing through the first raising mirror 21 as laser light for recording on the signal recording layer R1 by the focusing operation of the second objective lens L2.

In the case of the recording operation using such first optical disc D1, a driving current having a magnitude required for the recording operation is supplied to the laser diode 2, and the first laser light of the first wavelength is emitted from the laser diode 2. The first laser light emitted from the laser diode 2 enters the first diffraction grating 3, is split into the 0th-order light, the +1st-order light and the −1st-order light by the diffraction grating portion 3a making the first diffraction grating 3, and is converted into the linear polarization light in the S direction by the half-wave plate 3b. The first laser light having passed through the first diffraction grating 3 enters the first polarization beam splitter 4 and is reflected by the control film 4a included in the first polarization beam splitter 4, while a part of the laser light passes through the control film 4a to be applied to the first photodetector 5 for monitoring.

The first laser light reflected by the control film 4a enters the first collimating lens 7 through the first quarter-wave plate 6, to be converted into the parallel light by an action of the first collimating lens 7. The first laser light having been converted into the parallel light by the first collimating lens 7 is reflected by the first reflective mirror 8, to enter the wavelength selective polarization beam splitter 20.

The first laser light incident on the wavelength selective polarization beam splitter 20 is reflected by the control film 20a, to be applied to the first raising mirror 21. Of the first laser light incident on the first raising mirror 21, 90% passes therethrough in a direction of the second raising mirror 22 by the action of the control film formed on the first raising mirror 21, while 10% is reflected to enter the first objective lens L1.

The laser light having passed through the first raising mirror 21 as laser light for recording is reflected by the second raising mirror 22 to enter the second objective lens L2. The first laser light incident on the second objective lens L2 is applied as a spot onto the signal recording layer R1 of the first optical disc D1 by the focusing operation of the second objective lens L2. As described above, the first laser light emitted from the laser diode 2 is applied as a desired spot onto the signal recording layer R1 of the first optical disc D1, and the numerical aperture of the second objective lens L2 is set at 0.65 by the second aperture limiting element 24 in this case.

When the above-mentioned focusing operation of the first laser light is performed by the second objective lens L2, spherical aberration occurs due to thickness of the protective layer between the signal recording layer R1 and the signal incident face of the first optical disc D1, however, an adjustment can be made so that the spherical aberration is minimized by displacing the first collimating lens 7 shown in an embodiment according to the present invention in the optical path direction. Such an adjustment operation is generally carried out, and the description is omitted.

By the above operation, the first laser light is applied to the signal recording layer R1 included in the first optical disc D1, and in such irradiation operation, return light reflected from the signal recording layer R1 enters the second objective lens L2 from the first optical disc D1 side. The return light incident on the second objective lens L2 enters the first polarization beam splitter 4 via the second raising mirror 22, the first raising mirror 21, the wavelength selective polarization beam splitter 20, the first reflective mirror 8, the first collimating lens 7, and the first quarter-wave plate 6. Since the return light incident on the first polarization beam splitter 4 has been converted into the linear polarization light in the P direction, the return light passes through the control film 4a included in the first polarization beam splitter 4.

The return light of the first laser light having passed through the control film 4a enters the first sensor lens 9, and astigmatism is generated by an action of the first sensor lens 9. The return light in which the astigmatism is generated by the first sensor lens 9 is applied to a sensor portion of the four-divided sensor and the like included in the first photodetector 10 by the focusing operation of the first sensor lens 9. As a result of applying the return light to the first photodetector 10 as above, a generation operation of a focus error signal is carried out, as known, with using change in spot shape obtained by applying the return light to the sensor portion included in the first photodetector 10. The focusing control operation can be carried out by displacing the second objective lens L2 in a direction of the signal face of the first optical disc D1 with using such a focus error signal.

A recording operation of a signal to the signal recording layer R1 included in the first optical disc D1 is carried out by the above-mentioned control operation, and since a part of the first laser light is applied to the first photodetector 5 for monitoring during such recording operation, a value of a driving current to be supplied to the laser diode 2 can be controlled with using a monitor signal obtained from the first photodetector 5 for monitoring.

FIG. 3 shows a state of the above-mentioned recording operation, in which the spot of the laser light for recording is formed on the signal recording layer R1 of the first optical disc D1 by the focusing operation of the second objective lens L2, and the focusing operation by the first objective lens L1 is also in a state of being carried out at the same time. However, since the focusing point of the first objective lens L1 is made up so as to be different from the focusing point of the second objective lens L2 as shown in FIG. 3, the laser light for reproduction in the first laser light is not focused on the signal recording layer R1.

Therefore, even if the laser light for reproduction is applied onto the signal recording layer R1 by the focusing operation of the first objective lens L1, a reflected light amount of the laser light is small and an amount of the light applying to the first photodetector 10 as the return light does not affect the control operation for the recording operation.

The recording operation of a signal to the signal recording layer R1 included in the first optical disc D1 is carried out, as mentioned above. The reproduction operation of a signal recorded in the signal recording layer R1 will be described next.

The reproduction operation using the first optical disc D1 is carried out by a control operation for focusing the first laser light reflected by the first raising mirror 21 as the laser light for reproduction onto the signal recording layer R1 by the focusing operation using the first objective lens L1.

In the case of the reproduction operation using such first optical disc D1, a driving current having a magnitude required for the reproduction operation is supplied to the laser diode 2, and the first laser light of the first wavelength is emitted from the laser diode 2. The first laser light emitted from the laser diode 2 enters the first diffraction grating 3, is split into the 0th-order light, the +1st-order light and the −1st-order light by the diffraction grating portion 3a making up the first diffraction grating 3, and is converted into the linear polarization light in the S direction by the half-wave plate 3b. The first laser light having passed through the first diffraction grating 3 enters the first polarization beam splitter 4 and is reflected by the control film 4a included in the first polarization beam splitter 4, while a part of the laser light passes therethrough to be applied to the first photodetector 5 for monitoring.

The first laser light reflected by the control film 4a enters the first collimating lens 7 through the first quarter-wave plate 6 to be converted into the parallel light by the action of the first collimating lens 7. The first laser light having been converted into the parallel light by the first collimating lens 7 is reflected by the first reflective mirror 8, to enter the wavelength selective polarization beam splitter 20.

The first laser light incident on the wavelength selective polarization beam splitter 20 is reflected by the control film 20a, to be applied to the first raising mirror 21. Of the first laser light incident on the first raising mirror 21, 90% passes therethrough in a direction of the second raising mirror 22 by the action of the control film formed on the first raising mirror 21, while 10% is reflected to enter the first objective lens L1.

The laser light reflected by the first raising mirror 21 as laser light for reproduction enters the first objective lens L1. The first laser light incident on the first objective lens L1 is applied as a spot onto the signal recording layer R1 of the first optical disc D1 by the focusing operation of the first objective lens L1. As described above, the first laser light emitted from the laser diode 1 is applied as the desired spot onto the signal recording layer R1 of the first optical disc D1, and the numerical aperture of the first objective lens L1 in this case is set at 0.65 by the first aperture limiting element 23.

The irradiation operation of the first laser light to the signal recording layer R1 included in the first optical disc D1 is carried out by the above-mentioned operation, and in such irradiation operation, the return light reflected from the signal recording layer R1 enters the first objective lens L1 from the first optical disc D1 side. The return light incident on the first objective lens L1 enters the first polarization beam splitter 4 via the first raising mirror 21, the wavelength selective polarization beam splitter 20, the first reflective mirror 8, the first collimating lens 7, and the first quarter-wave plate 6. Since the return light incident on the first polarization beam splitter 4 has been converted into the linear polarization light in the P direction, the return light passes through the control film 4a included in the first polarization beam splitter 4.

The return light of the first laser light having passed through the control film 4a enters the first sensor lens 9, and astigmatism is generated by the action of the first sensor lens 9. The return light in which the astigmatism is generated by the first sensor lens 9 is applied to a sensor portion of the four-divided sensor and the like included in the first photodetector 10 by the focusing operation of the first sensor lens 9. As a result of applying the return light to the first photodetector 10 as above, a generation operation of the focus error signal is carried out, as known, with using change in spot shape obtained by applying the return light to the sensor portion included in the first photodetector 10. The focusing control operation can be carried out by displacing the first objective lens L1 in a direction of the signal face of the first optical disc D1 using such a focus error signal.

By the above-mentioned control operation, the reproduction operation of a signal recorded in the signal recording layer R1 included in the first optical disc D1 is carried out, and since a part of the first laser light is applied to the first photodetector 5 for monitoring during such reproduction operation, a value of the driving current supplied to the laser diode 2 can be controlled with using a monitor signal obtained from the first photodetector 5 for monitoring.

FIG. 4 shows a state of the above-mentioned reproduction operation state, in which a spot of the laser light for reproduction is formed on the signal recording layer R1 of the first optical disc D1 by the focusing operation of the first objective lens L1, and the focusing operation of the second objective lens L2 is also in a state of being carried out at the same time. However, since the focusing point of the second objective lens L2 is made up so as to be different from the focusing point of the first objective lens L1 as shown in FIG. 4, the laser light for recording in the first laser light is not focused on the signal recording layer R1.

Therefore, even if the laser light for recording is applied onto the signal recording layer R1 by the focusing operation of the second objective lens L2, a reflected light amount of the laser light is small and the light an amount of the light applying to the first photodetector 10 as the return light does not affect the control operation for the reproduction operation. Also, since the laser light for recording is not focused on the signal recording layer R1, there is no such a problem that a signal recorded in the signal recording layer R1 is deleted.

The recording operation and reproduction operation of a signal for the first optical disc D1 are carried out as described above, but since intensity on the disc face of the laser light for recording and the intensity on the disc face of the laser light for reproduction can be freely set by setting the transmittance and reflectance of the first laser light by the first raising mirror 21, the intensity of the first laser light emitted from the laser diode 2 at the recording operation can be made identical to the intensity thereof at the reproduction operation. Therefore, driving operation of the laser diode can be carried out in a range where quantum noise is small.

If the first optical disc D1 is used as above, the first objective lens L1 is used as the objective lens for reproduction and the second objective lens L2 is used as the objective lens for recording.

The operation when using the first optical disc D1, that is, the operation using the first optical system making up the optical pickup apparatus, is carried out as described above;

and an operation when using the second optical disc D2, that is, an operation using the second optical system, will be described next.

When using the second optical disc D2, a driving current is supplied to the 2-wavelength laser diode 11, so that the second laser light of the second wavelength is emitted from the 2-wavelength laser diode 11. Also, a selection control operation is carried out for the first aperture limiting element 23, thereby executing an operation of setting the numerical aperture of the first objective lens L1 at 0.45.

The second laser light emitted from the 2-wavelength laser diode 11 enters the second diffraction grating 12, is split into the 0th-order light, the +1st-order light and the −1st-order light by the diffraction grating portion 12a making up the second diffraction grating 12, and is converted into the linear polarization light in the S direction by the half-wave plate 12b. The second laser light from the second diffraction grating 12 enters the second polarization beam splitter 13 and passes through the control film 13a included in the second polarization beam splitter 13, while a part of the laser light is reflected to be applied to the second photodetector 14 for monitoring.

The second laser light having passed through the control film 13a impinges on the second reflective mirror 16 through the second quarter-wave plate 15, to be reflected. The second laser light reflected by the second reflective mirror 16 enters the second collimating lens 17 to be converted into the parallel light by an action of the second collimating lens 17. Then, the second laser light having been converted into the parallel light by the second collimating lens 17 enters the wavelength selective polarization beam splitter 20.

The second laser light incident on the wavelength selective polarization beam splitter 20 as above passes through the control film 20a to be applied to the first raising mirror 21. The second laser light incident on the first raising mirror 21 is totally reflected, as shown by a solid line in FIG. 5, and an aperture is limited by the first aperture limiting element 23 to enter the first objective lens L1. The second laser light incident on the first objective lens L1 is applied as a spot to the signal recording layer R2 of the second optical disc D2 by the focusing operation of the first objective lens L1. As mentioned above, the second laser light emitted from the 2-wavelength laser diode 11 is applied as the desired spot to the signal recording layer R2 of the second optical disc D2, and the numerical aperture of the first objective lens L1 is set at 0.45 in this case.

The second laser light is applied to the signal recording layer R2 included in the second optical disc D2 by the above-mentioned operation, and in such an irradiation operation, return light reflected from the signal recording layer R2 enters the first objective lens L1 from the second optical disc D2 side. The return light incident on the first objective lens L1 enters the second polarization beam splitter 13 through the first aperture limiting element 23, the first raising mirror 21, the wavelength selective polarization beam splitter 20, the second collimating lens 17, the second reflective mirror 16, and the second quarter-wave plate 15. Since the return light incident on the second polarization beam splitter 13 has been converted into the linear polarization light in the P direction, the return light is reflected by the control film 13a included in the second polarization beam splitter 13.

The return light of the second laser light reflected by the control film 13a enters the second sensor lens 18, and astigmatism is generated by an action of the second sensor lens 18. The return light in which the astigmatism is generated by the second sensor lens 18 is applied to a sensor portion of the four-divided sensor and the like included in the second photodetector 19 by the focusing operation of the second sensor lens 18. As a result of applying the return light to the second photodetector 19 as above, a generation operation of the focus error signal is carried out, as known, with using change in spot shape obtained by applying the return light to the sensor portion included in the second photodetector 19. The focusing control operation can be carried out by displacing the first objective lens L1 in a direction of the signal face of the second optical disc D2 with using such a focus error signal.

The reading-out operation of a signal recorded in the signal recording layer R2 of the second optical disc D2 is carried out, as above, and during such reading-out operation, since a part of the second laser light is applied to the second photodetector 14 for monitoring, a value of the driving current to be supplied to the 2-wavelength laser diode 11 can be controlled with using a monitor signal obtained from the second photodetector 14 for monitoring.

Since an output of the second laser light can be controlled by controlling the value of the driving current to be supplied to the 2-wavelength laser diode 11, there can be carried out not only the reading-out operation of a signal recorded in the second optical disc D2 but also the adjustment operation of the laser output required when recording a signal in the second optical disc D2.

The operation for the second optical disc D2 using the second optical system is carried out, as described above, and an operation for the third optical disc D3 using the second optical system will be described next.

When using such third optical disc D3, a driving current is supplied to the 2-wavelength laser diode 11 so that the third laser light of the third wavelength is emitted from the 2-wavelength laser diode 11. Also, the selection control operation is carried out for the first aperture limiting element 23, thereby executing an operation of setting the numerical aperture of the first objective lens L1 at 0.6. With such a selection control operation for the first aperture limiting element 23, the third laser light is focused and applied to the signal recording layer R3 included in the third optical disc D3. The optical path of the third laser light in this case is shown by a broken line in FIG. 5.

In such a state, the third laser light emitted from the 2-wavelength laser diode 11 is applied to the signal recording layer R3 of the third optical disc D3 through the same optical path as that in the case of the above-mentioned second laser light, and return light reflected from the signal recording layer R3 is also applied to the second photodetector 19 through the same optical path. Therefore, an operation similar to the focusing control operation to the second optical disc D2 is also performed for the third optical disc D3. There can be similarly carried out the control operation of the laser output using the monitor signal, which is obtained from the second photodetector 14 for monitoring.

In an embodiment according to the present invention, although the 2-wavelength laser diode emitting laser lights having two different wavelengths is used as a configuration of the second optical system, the system can be configured by using a plurality of laser diodes emitting laser light having a single wavelength.

In an embodiment according to the present invention, the HD DVD-standard optical disc is used as the first optical disc D1, but the Blu-ray-standard optical disc may also be used, and in such a case, the numerical aperture is set at 0.85 by the first aperture limiting element 23 and the second aperture limiting element 24.

In an embodiment of the present invention, there is used the first objective lens L1 arranged on the outer circumference side as an objective lens for focusing the second laser light and the third laser light obtained from the second optical system to the signal recording layer R2 of the second optical disc D2 and the signal recording layer R3 of the third optical disc D3, however, a configuration can be made such that the second objective lens L2 is used as the objective lens.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
   a first objective lens;
   a second objective lens arranged with the first objective lens in a radial direction of an optical disc,
      the first objective lens being configured to focus laser light for reproduction, which is laser light for reproducing a signal recorded in a signal recording layer of the optical disc, onto the signal recording layer, and
      the second objective lens being configured to focus laser light for recording, which is laser light for recording a signal, onto the signal recording layer;
   a first raising mirror; and
   a second raising mirror,
      wherein the first raising mirror
         reflects the laser light for reproduction in a direction of the first objective lens, and
         allows the laser light for recording to pass through the first raising mirror in a direction of the second raising mirror, and
      wherein the second raising mirror reflects the laser light for recording in a direction of the second objective lens.

2. The optical pickup apparatus of claim 1, wherein
   the first objective lens is arranged closer to an outer circumference of the optical disc than the second objective lens.

3. The optical pickup apparatus of claim 1, wherein
   the first raising mirror includes a polarization beam splitter for reflecting the laser light for reproduction and allowing the laser light for recording to pass through the first raising mirror.

4. The optical pickup apparatus of claim 1, wherein
   the first raising mirror includes an adjustment film for adjusting reflectance of the laser light for reproduction and transmittance of the laser light for recording.

5. The optical pickup apparatus of claim 1, wherein
   the second raising mirror totally reflects the laser light for recording.

6. The optical pickup apparatus of claim 1, further comprising:
   a first aperture adjustment element configured to adjust a numerical aperture of the first objective lens; and
   a second aperture adjustment element configured to adjust a numerical aperture of the second objective lens, wherein
   the first aperture adjustment element and the second aperture adjustment element respectively adjust the numerical apertures of the first objective lens and the second objective lens so that when one of the laser light for reproduction and the laser light for recording is focused onto the signal recording layer, the other of the laser light for reproduction and the laser light for recording is not focused onto the signal recording layer.

7. An optical pickup apparatus comprising:
   a first objective lens; and
   a second objective lens arranged with the first objective lens in a radial direction of a first optical disc and a second optical disc,
   when a first laser light having a first wavelength is emitted, the first objective lens being configured to focus laser light for reproduction obtained from the first laser light onto a first signal recording layer of the first optical disc so as to reproduce a signal recorded in the first signal recording layer, and the second objective lens being configured to focus laser light for recording obtained from the first laser light onto the first signal recording layer so as to record a signal, and
   when a second laser light having a second wavelength different from the first wavelength is emitted, the first objective lens being configured to focus the second laser light onto a second signal recording layer of the second optical disc so as to reproduce a signal recorded in the second signal recording layer or record a signal.

8. The optical pickup apparatus of claim 7, wherein
   the first objective lens is arranged closer to an outer circumference of the first optical disc and the second optical disc than the second objective lens.

9. The optical pickup apparatus of claim 7, further comprising:
   a first raising mirror; and
   a second raising mirror, wherein
   when the first laser light is emitted, the first raising mirror guides the laser light for reproduction to the first objective lens, and the second raising mirror guides the laser light for recording to the second objective lens, and
   when the second laser light is emitted, the first raising mirror guides the second laser light to the first objective lens.

10. The optical pickup apparatus of claim 9, wherein
    when the first laser light is emitted, the first raising mirror reflects the laser light for reproduction in a direction of the first objective lens and allows the laser light for recording to pass through the first raising mirror in a direction of the second raising mirror, and the second raising mirror reflects the laser light for recording in a direction of the second objective lens, and
    when the second laser light is emitted, the first raising mirror reflects the second laser light in the direction of the first objective lens.

11. The optical pickup apparatus of claim 10, wherein
    the first raising mirror includes a polarization beam splitter for reflecting the laser light for reproduction and allowing the laser light for recording to pass through the first raising mirror.

12. The optical pickup apparatus of claim 10, wherein
    the first raising mirror includes an adjustment film for adjusting reflectance of the laser light for reproduction and transmittance of the laser light for recording.

13. The optical pickup apparatus of claim 10, wherein
    the second raising mirror totally reflects the laser light for recording.

14. The optical pickup apparatus of claim 7, further comprising:
    a first aperture adjustment element configured to adjust a numerical aperture of the first objective lens; and
    a second aperture adjustment element configured to adjust a numerical aperture of the second objective lens, wherein
    the first aperture adjustment element and the second aperture adjustment element respectively adjust the numerical apertures of the first objective lens and the second objective lens so that when one of the laser light for reproduction and the laser light for recording is focused onto the first signal recording layer, the other of the laser light for reproduction and the laser light for recording is not focused onto the first signal recording layer.

* * * * *

UNITED STATES PATENT AND TRADEMARK OFFICE
CERTIFICATE OF CORRECTION

PATENT NO. : 7,898,910 B2
APPLICATION NO. : 12/147564
DATED : March 1, 2011
INVENTOR(S) : Tohru Hotta et al.

It is certified that error appears in the above-identified patent and that said Letters Patent is hereby corrected as shown below:

On title page, item (73), in "Assignees", in column 1, line 2, delete "co.," and insert -- Co., --, therefor.

Signed and Sealed this
Seventeenth Day of May, 2011

David J. Kappos
*Director of the United States Patent and Trademark Office*